Feb. 17, 1970 S. A. MENCACCI 3,495,523
ROTARY PRESSURE COOKER
Filed Aug. 3, 1967 4 Sheets-Sheet 3
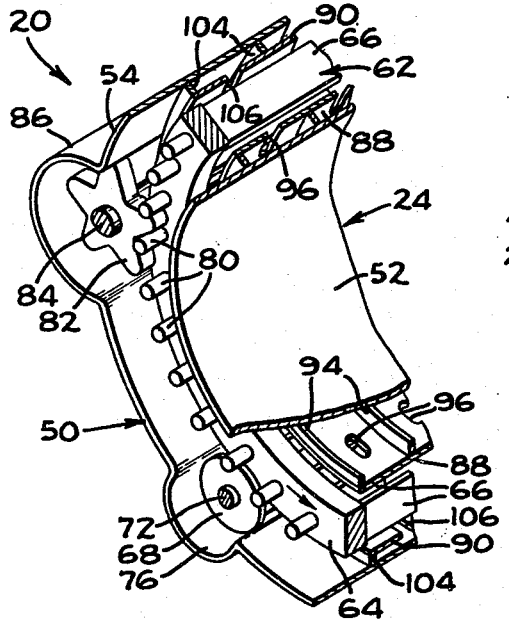
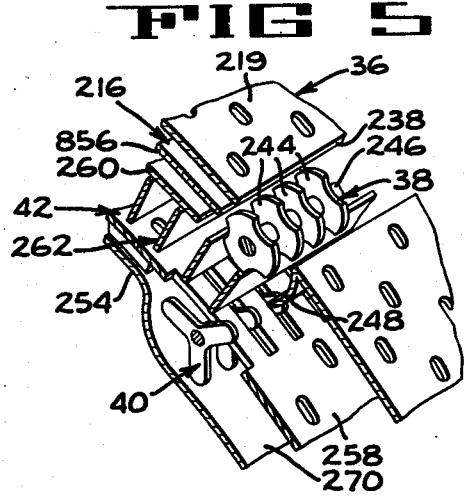
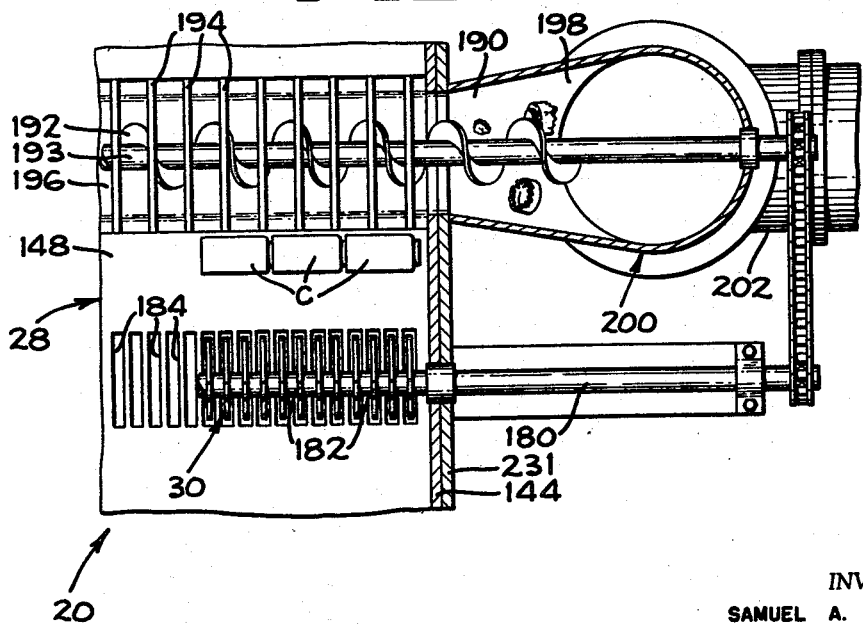
INVENTOR.
SAMUEL A. MENCACCI
BY
F. W. Anderson
C. E. Tripp ATTORNEYS Feb. 17, 1970   S. A. MENCACCI   3,495,523
ROTARY PRESSURE COOKER
Filed Aug. 3, 1967   4 Sheets-Sheet 4
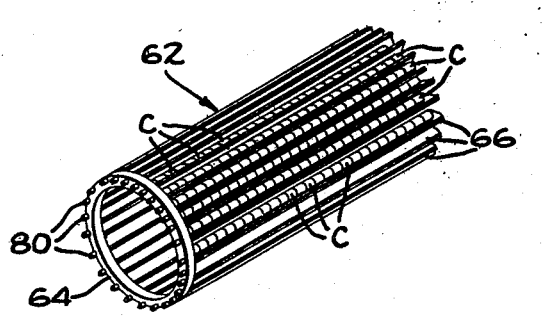
FIG_6A
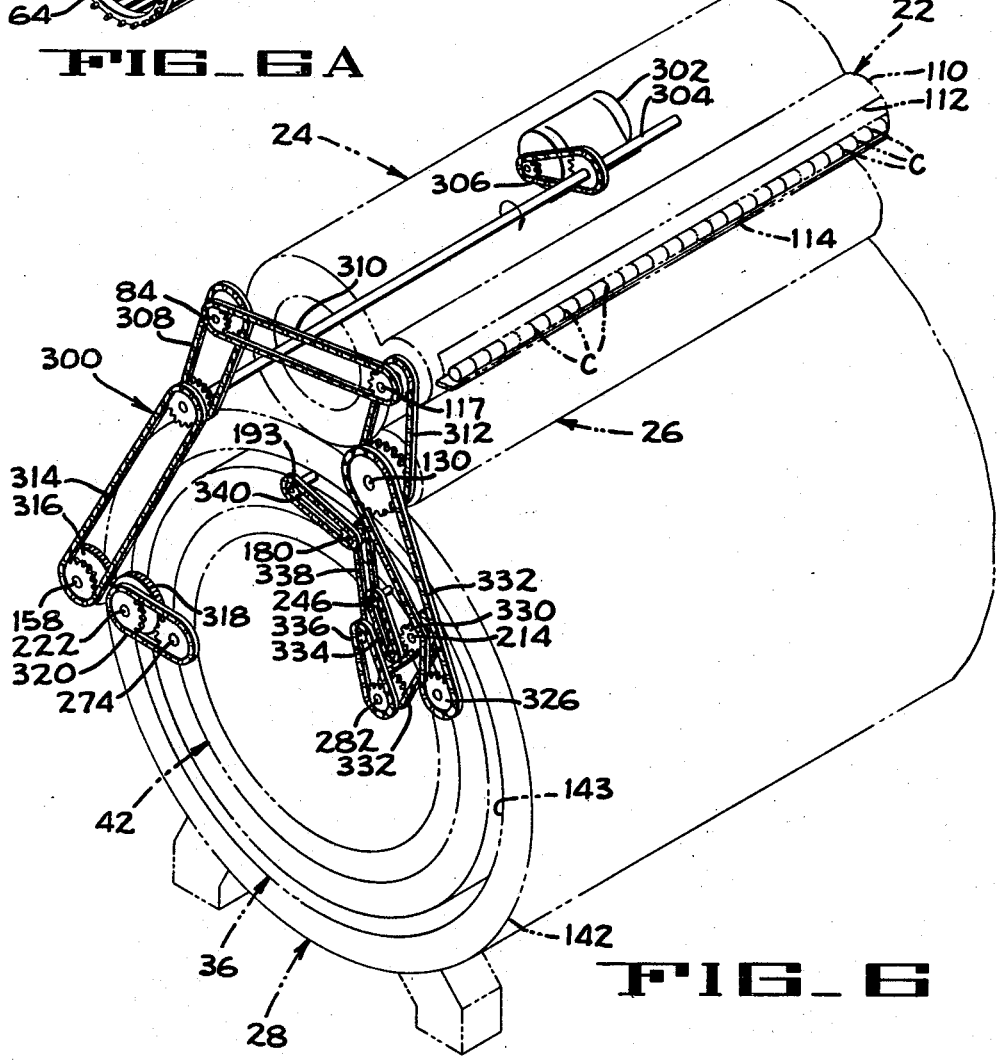
FIG_6
INVENTOR.
SAMUEL A. MENCACCI
BY
F. W. Anderson
C. E. Tripp ATTORNEYS

United States Patent Office 3,495,523
Patented Feb. 17, 1970

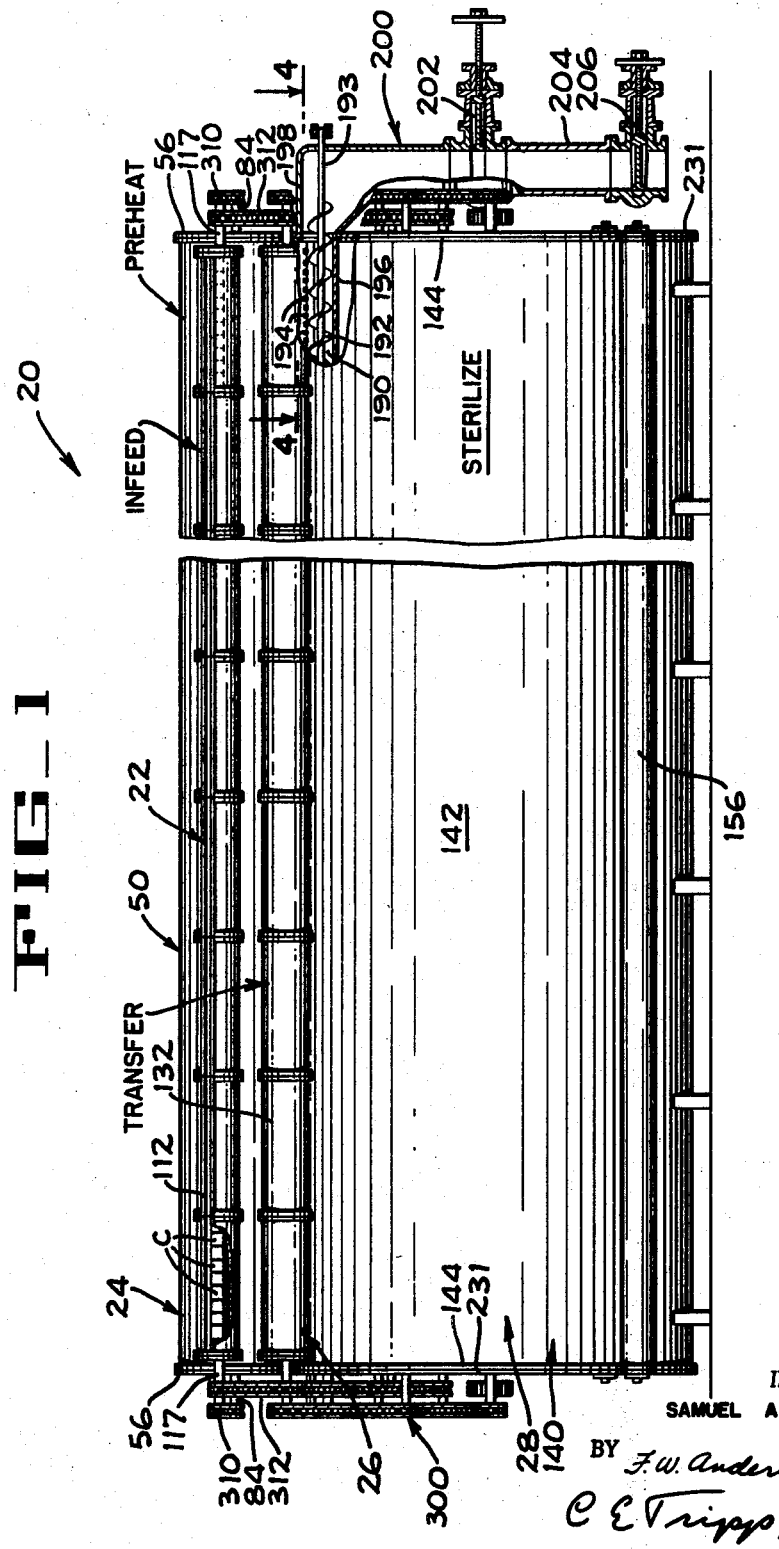

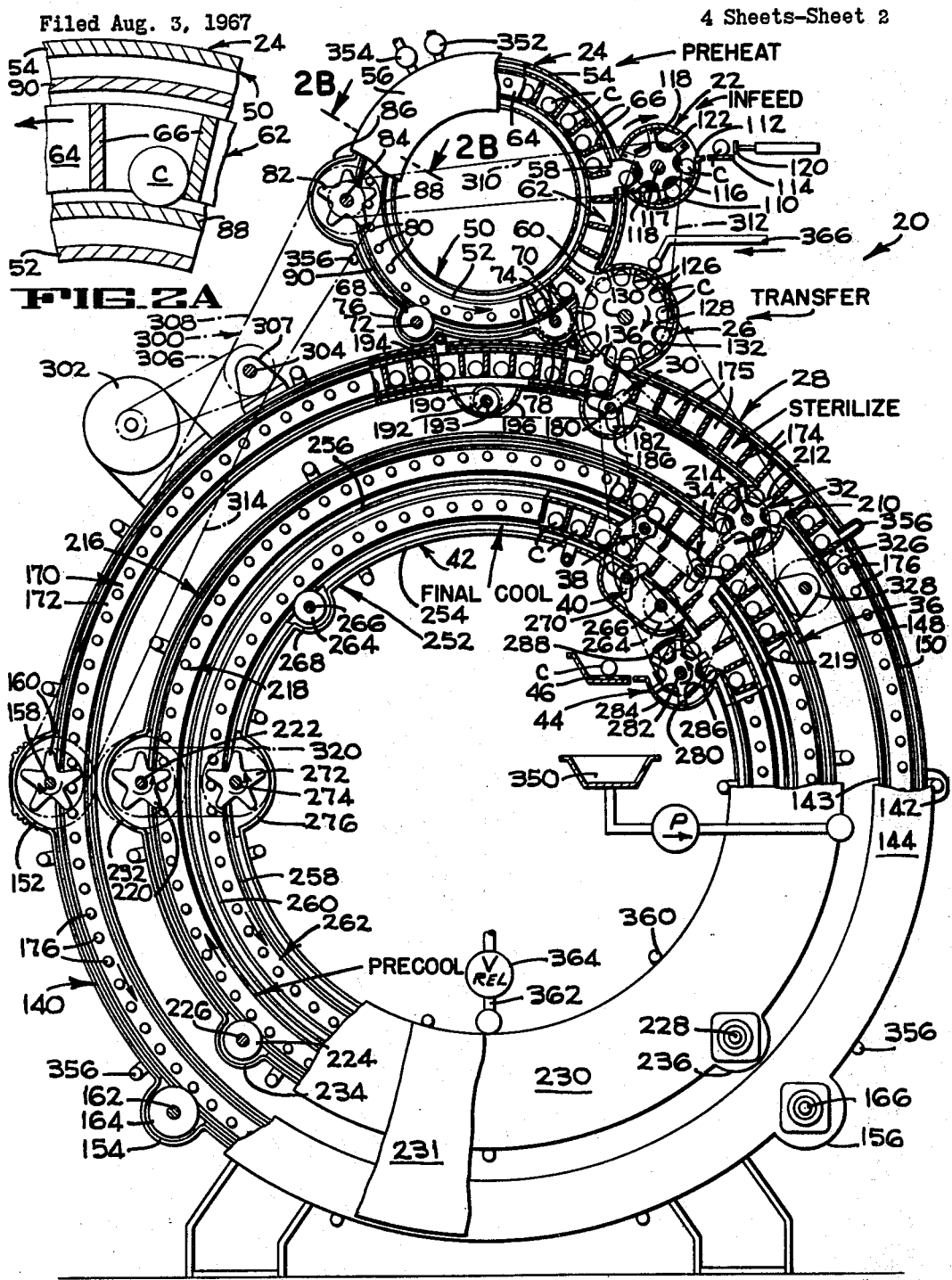

3,495,523
ROTARY PRESSURE COOKER
Samuel A. Mencacci, Wilrijk-Antwerp, Belgium, assignor to International Machinery Corporation S.A., St. Nicholas, Pays de Waas, Belgium, a corporation of Belgium
Filed Aug. 3, 1967, Ser. No. 658,105
Int. Cl. A23l 3/06
U.S. Cl. 99—366                      14 Claims

ABSTRACT OF THE DISCLOSURE

A high capacity, low speed rotary cooking and cooling apparatus for handling cooker length rows of containers within a series of annular processing housings interconnected by star wheel transfer turrets. A reel in each housing is arranged to move each container around an arcuate path, and at least one of said annular housings is of sufficient size to encompass another housing. The apparatus may include pressure feed and discharge valves capable of handling an entire row of containers at one time.

BACKGROUND OF THE INVENTION

This invention pertains to improved rotary cooking and cooling apparatus and more particularly relates to a cooking and cooling apparatus having annular processing chambers interconnected by transfer valves and having driven reels in each chamber adapted to advance rows of containers through the apparatus.

The pressure feed and discharge valves may be of the type disclosed in the pending application of Mencacci et al. Ser. No. 530,191 which was filed on Feb. 25, 1966, now Patent No. 3,340,791 which issued on Sept. 12, 1967.

The cooking and cooling apparatus of the present invention is especially suitable for handling cylindrical glass jars, such as the well known wide mouth baby food jars, although it is to be understood that cans, plastic containers or other types of jars may also be handled in the apparatus, and that the containers may be irregular in shape, for example, square.

In recent years glass jar manufacturers have provided jars which can withstand considerable temperature changes, and accordingly, can be processed without excessive glass breakage in cookers which gradually raise the temperature from normal room temperature to about 245° F. and then cool the containers back to approximately room temperature.

One known system for processing glass jars is to individually encapsulate each jar and to pass the same through a series of well known reel and spiral heat treatment apparatus. When handling encapsulated glass jars with this type of reel and spiral apparatus, five of the reel and spiral units are interconnected and usually include a rotary preheater, a rotary pressure preheater, a rotary sterilizer, a rotary cooler, and a rotay atmospheic cooler. These five processing units are not only expensive but they also require considerable floor space.

A much more difficult problem with the type system is that each container mentioned above is handled independently and is moved around a spiral path within each of the processing units from one end thereof to the other by a stationary spiral track which cooperates with a continuously rotating reel. Accordingly each container, or capsule, is subjected to considerable wear as it is spirally advanced through the several processing units. Also, since each container is handled independently in the system, it will be appreciated that if a processing speed of 400 containers per minute is desired, the individual containers must be moved at a very high rate of speed into, through, and out of the several reel and spiral heat treatment units. This high speed not only increases the glass breakage rate but also cause excessive wear to the machine and to the capsules within which the containers are confined. It will also be understood, if the containers were not encapsulated, the external surfaces of the glass jars would be scratched, and also, the jar caps would be damaged or dislodged from the jars due to their high speed sliding engagement with the spiral tracks within the several processing units.

When heating containers to a temperature substantially above the boiling point of water, it is necessary to subject the containers to a super-atmospheric pressure. This is especially true when handling wide mouth glass jars since the caps tend to burst from the jars if the pressure within the jars exceeds the pressure acting on the external surfaces thereof.

SUMMARY OF THE INVENTION

The preferred embodiment of the rotary cooking and cooling apparatus of the present invention is designed to sterilize cooker length rows of glass containers having about 100 containers in each row without requiring that the containers be encapsulated. The apparatus continuously advances the rows of containers at the very slow speed of about four rows per minute through a plurality of annular heat treatment housings with each row of containers moving as a unit around an arcuate, rather than a helical path while in each housing. Because the housings are annular, rather than cylindrical, large diameter housings are used since only the relatively small annular end faces need be sealed, there being no need to seal the entire end area as would be required if a cylindrical housing of the same diameter were to be used. One or more small diameter processing housings are disposed within the large diameter annular housing.

The several housings are interconnected by transfer turrets which transfer the rows of containers between the several annular housings. At least the inlet transfer turret and the discharge transfer turret are formed as rotary pressure valves thus permitting the pressure within the housings to be above atmospheric pressure. Water maintained at the desired temperature and subjected to an overriding air pressure is the preferred heat treatment medium when handling jars. However, it will be understood that steam or a steam-air mixture may be used as the heating medium if desired.

Since the containers are handled as long rows rather than as individual containers, an apparatus which advances rows of 100 containers each at the very slow speed of four rows per minute is capable of sterilizing containers at the rate of 400 containers per minute when the largest annular processing chamber is about 12 feet in diameter and about 40 feet long. An apparatus of this size would have a holding capacity of about 16,000 containers.

It is, therefore, one object of the present invention to provide a rotary pressure cooking and cooling apparatus adapted to handle long cooker length rows of containers and to pass the rows of containers through annular processing housings at very slow speeds.

Another object is to provide a rotary cooking and cooling apparatus capable of handling glass jars without encapsulation.

BRIEF DESCRIPTION OF THE DRAWINGS

FIGURE 1 is a side elevation of the preferred embodiment of the cooking and cooling apparatus of the present invention, certain parts being cut away and other parts being shown in section.

FIGURE 2 is an enlarged diagrammatic end elevation of the apparatus of FIGURE 1 with certain parts cut away and other parts shown in section or in phantom.

FIGURE 2A is an enlarged vertical section illustrating a fragment of one of the annular housings with a portion of the reel therein.

FIGURE 2B is an enlarged section taken along lines 2B—2B of FIGURE 2 illustrating one sealed end portion of an annular housing with the reel therein.

FIGURE 3 is an enlarged perspective of a fragment of the preheater illustrated in FIGURE 2.

FIGURE 4 is an enlarged section taken along lines 4—4 of FIGURE 1.

FIGURE 5 is an enlarged perspective of a fragment of the precooler illustrated in FIGURE 2 showing a transfer device and a let-down device which cooperate to transfer the rows of containers from the precooler to the final cooler.

FIGURE 6 is a perspective illustrating the drive parts at one end of the cooking and cooling apparatus.

FIGURE 6A is a perspective of one end of one of the reels showing several rows of containers positioned therein.

DESCRIPTION OF PREFERRED EMBODIMENTS

The rotary pressure cooking and cooling apparatus 20 (FIGS. 1 to 6) of the present invention comprises, in general, a rotary pressure feed valve 22 which advances cooker length rows of about 100 containers C in a counterclockwise direction into a rotary preheater 24 at the rate of about four rows per minute, which preheater raises the temperature of the containers to substantially that of the sterilizing temperature. The preheater 24 advances the rows of containers into a transfer turret 26 which discharges the containers into a rotary sterilizer 28 with the aid of a rotary let-down device 30. The sterilizer 28 (FIG. 2) moves the rows of containers in a counterclockwise direction during which time the contents of the containers are sterilized, and thereafter discharges the rows of sterilized containers into a transfer turret 32. The transfer turret 32, with the aid of a let-down device 34, transfers the rows of containers into a rotary pre-cooler 36 which moves the rows of containers in a clockwise direction and discharges them, with the aid of a transfer device 38 and a let-down device 40 into a final cooler 42. The final cooler 42 advances the containers in a counterclockwise direction and discharges them into a pressure discharge valve 44 which releases the fully processed and cooled rows of containers onto a take-away conveyor 46 for discharge from the apparatus.

Although only the details at one end of the cooking and cooling apparatus 20 are illustrated in FIGURES 2, 3 and 5 of the drawings, it will be understood that the other end of the apparatus is constructed in exactly the same manner. It will further be understood that the above described elements may be constructed as relatively short modules that are bolted together to make a cooking and cooling apparatus of the desired length. For example, four ten foot modules may be bolted together to provide a cooker having a total length of 40 feet. If a four-section modular construction is used, it will be understood that both ends of each module will be constructed substantially as illustrated in FIGURE 2, and that each row of containers will include four groups of containers which are slightly spaced from each other so as to provide voids in each row opposite the intermediate walls of the modules. However, to simplify the detailed description to follow, the cooking and cooling apparatus 20 will be described as a single long unit rather than as a unit made up of several interconnected modular sections.

More particularly, the preheater 24 (FIGS. 2 and 3) comprises an elongated annular preheater housing 50 defined by an inner cylindrical wall 52, an outer substantially cylindrical wall 54 and two annular end plates 56 (FIG. 1) secured in fluid tight engagement to the ends of the walls 52 and 54. The pressure feed valve 22 is secured to the outer wall 54 in communication with an elongated inlet opening 58 therein, and the transfer turret 26 is likewise secured to the outer wall in communication with an elongated outlet opening 60 therein as clearly indicated in FIGURE 2.

An annular reel 62 (FIGS. 2, 3 and 6A) is disposed within the preheater housing 50 and is concentric with the walls 52 and 54. The reel 62 includes a pair of identical end rings 64, one ring being disposed adjacent each end of the housing 50, and a plurality of evenly spaced radially extending bars 66 which are welded to the rings 64 and extend longitudinally of the housing 50. Each ring 64 is mounted on trunnions 68 and 70 which are secured on shafts 72 and 74, respectively, journaled in the housing end walls 56. The trunnions 68 and 70 are received in semi-cylindrical troughs 76 and 78, respectively, that extend the full length of the housing 50. The troughs 76 and 78 are sealed in fluid tight engagement to the lower portion of the cylindrical outer wall 54 and are also secured in fluid tight engagement to the end plates 56 as by bolting. A plurality of equally spaced drive pins 80 are secured to and project outwardly from each ring 64. The pins 80 on each ring 64 mesh with a drive gear 82, and the drive gears 82 are keyed to a preheater drive shaft 84 that preferably extends the full length of the apparatus 20 and is journaled in bearings mounted on the two annular end plates 56. A semi-cylindrical trough 86 is secured in fluid tight engagement to the outer housing wall 54 and to the end plates 56 and cooperates with the annular housing 50 to provide a fluid tight area within which the drive gears 82 operate.

In order to minimize the presence of scratches and rust marks on the containers which marks mar the appearance of the containers, and in order to improve circulation of the heat treatment medium through the preheater housing 50, a stainless steel inner liner 88 and a stainless steel outer liner 90 are provided. The inner liner 88 (FIG. 3) is a cylindrical tube which has a plurality of spacer rings 94 welded thereto and supported by the inner cylindrical wall 52 of the preheater housing 50. A plurality of openings 96, such as slots, are formed in the liner 88 to permit free flow of heat transfer fluid therethrough. The outer liner 90 comprises a generally cylindrical member having an elongated inlet opening and outlet opening therein which are alined with the inlet opening 58 and outlet openings 60, respectively, of the outer cylindrical wall 54 of the preheater housing 50. A plurality of spaced rings 104 (FIG. 3) are welded to the outer surface of the outer liner 90 and space the liner from the outer housing wall 54 so that fluid can freely circulate between the liner 90 and wall 54 as well as through slots 106 in the liner 90.

The pressure feed valve 22 comprises a substantially cylindrical housing 110 having an elongated inlet opening 112 for receiving rows of containers from a row forming device 114 of any well known design, and an elongated discharge opening communicating with the opening 58 in the preheater housing 50. A reel 116 is mounted on a shaft 117 and has a plurality of equally spaced pockets 118 therein. The reel shaft 117 is journaled in the end plates of the housing 110 and is continuously driven in a clockwise direction (FIG. 2) to receive rows of containers which are deflected off the row forming device 114 by an intermittently operated hydraulic deflector 120. Elongated cam operated paddles 122 may be provided in each pocket 118 for first gently guiding each row of containers into a pocket and for subsequently gently deflecting each row out of a pocket and between adjacent bars 66 of the preheater reel 62. The pockets 118 of the reel 116 are individually sealed to the housing 110 in a well known manner thus permitting super-atmospheric pressure to be maintained in the preheater housing 50.

The specific details of the pressure feed valve 22 form no part of the present invention, accordingly, these parts will not be described in detail. If a complete description of the pressure valve is desired, reference may be had to the aforementioned Mencacci et al. application.

As mentioned previously, the preferred heat treatment medium used in the several processing chambers of the cooking and cooling apparatus 20 is water which is maintained at the desired temperatures in each chamber by suitable thermostatic controls (not shown) and which is maintained under pressure by an overriding air pressure in the preheater housing 50. The water level in the preheater 24 is maintained at a level slightly below the level of the inlet opening 58.

In the preferred embodiment of the invention rows of containers moving through the preheater 24 will be gradually raised to about the sterilizing temperature, for example 250° F., and will be discharged through the preheater discharge opening into pockets 126 in the reel 128 of the transfer turret 26. The reel 128 is mounted on a shaft 130 and is continuously driven in a clockwise direction (FIG. 2) within a cylindrical housing 132 having an elongated inlet opening and an elongated discharge opening 136 therein. Since the temperature of the containers is raised while in the preheater 24 to substantially the sterilizing temperature, and since there is no desire to maintain a pressure differential between the preheater 24 and the sterilizer 28, the pockets 126 of the reel 128 need not be sealed to the housing 132.

The sterilizer 28 is constructed in substantially the same manner as the preheater 24 and includes an annular housing 140 defined by cylindrical outer shell 142, a cylindrical inner shell 143 concentric therewith, and a pair of annular end plates 144 (FIG. 1) which are connected together in fluid tight engagement to define an annular sterilizing chamber. An inner liner 148 and an outer liner 150 that are similar to the liners 80 and 90 of the preheater 92 are mounted within the housing 140. The outer shell 142 has semi-cylindrical troughs 152, 154 and 156 secured in fluid-tight relation thereto and to the end plates 144 which accommodate, respectively, a sterilizer drive shaft 158 having drive gears 160 secured near opposite ends thereof, a first trunnion shaft 162 having trunnions 164 keyed thereon near opposite ends thereof, and a second trunnion shaft 166 having trunnions (not shown) keyed thereon near opposite ends thereof. The shafts 158, 160 and 166 journaled in bearings secured to the end plates 144. A large diameter sterilizer reel 170 is rotatably mounted within the housing 140 and comprises a pair of rings 172 (only one being shown) having a plurality of evenly spaced container advancing bars 174, that define row accommodating pockets 175, welded thereto and extending therebetween. A plurality of evenly spaced drive pins 176 are secured to each ring 172 and mesh with the associated drive gears 160 which continuously drive the reel 170 in a counterclockwise direction (FIG. 2) at the rate of about four pockets per minute.

The discharge opening 136 of the transfer turret 26 communicates with an elongated inlet opening formed in the outer shell 142 and in the outer liner 150 and permits rows of containers to pass therethrough when entering the rotary sterilizer 28. The rotary let-down device 30 is positioned immediately below the inlet opening in order to prevent injury to the rows of containers by decreasing the distance they drop as they are discharged by the transfer turret 26 and are accepted within one of the pockets 175 of the sterilizer 28.

The let-down device 30 (FIGS. 2 and 4) comprises a shaft 180 which is journaled in the end plates 144 and has three longitudinally extending rows of equally spaced radially extending let-down fingers 182 secured thereto. The let-down device 30 is continuously driven so that each row of longitudinally spaced fingers 182 pass through a series of longitudinally spaced slots 184 in the inner liner 148. The let down device 30 is confined within a trough 186 (FIG. 2) that is secured in fluid tight engagement to the inner shell 142 and to the end plates 144. Thus, as the sterilizer reel is rotated in a counterclockwise direction (FIG. 2) one row of let-down fingers 182 enters the particular reel pocket 175 that is about to receive a row of containers from the transfer turret 26, thus greatly reducing the distance the row of containers will drop when entering the pocket thereby minimizing mechanical impact to the containers when they are transferred into the sterilizer.

Although the glass jars are designed to handle considerable impact forces and also substantial thermal shock due to an abrupt change of temperature, there are always a few weak containers which will break while in the apparatus 20. Accordingly, a broken glass eliminator 190 is disposed adjacent the let-down device 30. The broken glass eliminator 190 comprises a screw conveyor 192 mounted on a shaft 193 and disposed below a grill defined by a plurality of spaced bars 194, which grill forms part of the inner liner 148. The space between the bars 194 is wide enough to permit large pieces of glass to pass therethrough, but is not large enough to permit a sound jar to pass therethrough.

The conveyor 192 extends the full length of the cooker and is housed in a trough 196 that is sealed in fluid tight engagement to the inner shell 143 and at its inlet end to one of the end plates 144. The discharge end of the screw conveyor 192 (FIGS. 1 and 4) projects through an opening in the adjacent end plate 144 and into an elbow 198 secured in fluid tight relation to the end plate 144 adjacent the discharge end of the screw conveyor 192. The screw conveyor shaft 193 is continuously driven and is journaled in one of the end plates 144 and in the elbow 198.

The elbow 198 forms part of an accumulator 200 which includes an upper gate valve 202 (FIG. 1) secured to the elbow 198 and to an accumulator pipe section 204, and a lower gate valve 206 secured to a pipe section 204. During normal operation, the upper valve 204 is open and the lower valve 206 is closed. Accordingly, all broken glass conveyed from below the bars 194 will fall into the accumulator between the two valves. The upper valve 202 is periodically opened and the lower valve closed so as to periodically release broken glass from the accumulator without interference with the normal operation of the cooking and cooling apparatus 20.

After the rows of containers hae been moved through the sterilizer 28, they are transferred through an opening 210 in the inner liner 148 and inner shell 143 of the sterilizer 28 into the transfer turret 32 which includes a pocketed reel 212 mounted on a shaft 214. The transfer turret 32 may be identical to the feed valve 22 except, in accordance with the preferred embodiment of the present invention, the turret 32 need not be a pressure sealing valve but may permit fluid to freely flow therepast.

The rows of sterilized containers C are transferred by the turret 32 into the precooler 36 which includes an annular housing 216 that is concentric with but smaller in diameter than the sterilizer housing 140. The housing 216 is constructed in substantially the same manner as the sterilizer housing 140 and has a precooler reel 218 therein which is substantially the same as the preheater reel 62 and sterilizer reel 170. Accordingly, the housing 216 and reel 218 will not be described in detail.

The reel 218 is driven in a clockwise direction (FIG. 2) by drive gears 220 keyed near the ends of a precooler drive shaft 222, and the reel is rotatably supported by pairs of trunnions 224 (only one being shown) mounted on shafts 226 and 228. The shafts 222, 226 and 228 are journaled on annular end plates 230 which serve to close the opposite ends of both the precooler 36 and final cooler 42 as a unit. The end plates 230 may be connected to the associated end plates 144 of the sterilizer by any suitable means, such as by annular discs 231 (FIG. 1) which are bolted to the associated plates 144 and which are apertured to permit the several shafts to project therethrough. The shafts 222, 226 and 228, and the gears or trunnions thereon, are disposed within semi-cylindrical housings 232, 234 and 236, respectively, which are sealed to the end plate 230 and to the outer shell of the annular housing 216.

The rows of containers released from the transfer turret 32 are received in adjacent pockets of the reel 218 and are gently lowered against the inner liner 219 (FIG. 2) of the precooler 36 by the let-down device 34 which is identical to the let-down device 30 (FIG. 4) and, accordingly, will not be described in detail. As the rows of containers are moved through the precooler 36 in a clockwise direction (FIG. 2) they are gradually cooled and are then discharged through an elongated slot 238 (FIG. 5) in the inner liner 219 and inner shell of the housing 216 into the final cooler 42.

The transfer device 38 (FIGS. 2 and 5) is provided in order to gently transfer the rows of containers between the precooler 36 and final cooler 42. The transfer device 38 comprises a three-pocketed rotor 244 (FIG. 5) that is mounted on a continuously driven shaft 246 journaled in the end plate 230. The shaft 246 is continuously driven in a clockwise direction and advances each row, in turn, downwardly past an elongated arcuate guide plate 248 which is an extension of the inner liner 219 of the precooler housing 216 and is concentric with the shaft 246. Thus, complete control is maintained over each row of containers by the rotor 244 and arcuate plate 248 (FIG. 5) until the row is released into associated pockets in the final cooler 42. The let-down device 40 in the final cooler 42 cooperates with the transfer device 48 to gently lower each row fully into its associated pocket.

The final cooler 42 is concentric with and is constructed in a manner quite similar to the preheater 24, sterilizer 28, and precooler 36. The final cooler 42 is disposed within the precooler 36 and comprises a housing 252 having an inner shell 254 and an outer shell 256 sealed to the end plates 230. An inner liner 258 and outer liner 260 are fitted in the housing 252. A final cooler reel 262 is similar to the preheater reel 62 and is rotatably mounted within the housing 252 on pairs of trunnions 264 (FIG. 2) near the upper end thereof. The trunnions 264 are keyed to shafts 266 which are journaled in the end plates 230 and are confined within the housing by troughs 268 and 270 secured in fluid tight engagement to the inner shell 254 and end plates 230. The reel 262 is driven in a counterclockwise direction by gears 272 (only one being shown) keyed to a drive shaft 274 that is journaled on the end plates 230. The shaft 274 and gears 272 are confined within a semi-cylindrical trough 276 that is sealed to the inner shell 254 and to the end plates 230.

After the rows of containers have been moved in a counterclockwise direction through the final cooler 42 at which time they are cooled to a temperature somewhat below the boiling point of water at atmospheric pressure, the rows gravitate one at a time into the pressure discharge valve 44. The pressure discharge valve 44 is identical to the pressure feed valve 22 and includes an elongated pocketed reel 280 keyed to a shaft 282 which is continuously driven in a counterclockwise direction. The reel 280 is rotatable within and sealed to a cylindrical housing 284 supported by the inner shell 254 and has an elongated inlet opening 286 communicating with the housing 252 and an elongated discharge opening 288 which discharges the rows of processed and cooled containers onto the takeaway conveyor 46.

A drive system 300 (FIGS. 1, 2 and 6) is provided in order to continuously drive the several rotary components of the apparatus 20 in timed relation and at the rate of about four rows per minute. Although the drive system 300 includes identical parts on both ends of the apparatus, only the drive parts at one end of the apparatus will be described in detail in order to simplify the description thereof, and comparable parts on the other end of the apparatus will be assigned the same numerals.

The drive system 300 (FIGS. 2 and 6) comprises a gear motor 302 which is connected to a longitudinally extending main drive shaft 304 by a chain drive 306 and continuously drives this shaft in a clockwise direction. The shaft 304 is journaled in brackets 307 bolted to the sterilizer housing 140 and extends the full length of the apparatus 20. The preheater drive shaft 84 is driven from the main drive shaft 304 by a chain drive 308, thereby driving the preheater reel 62 in a counterclockwise direction by means of the gears 82. The reel 116 of the pressure feed valve 22 is driven in a clockwise direction by a chain drive 310 which interconnects the shafts 84 and 117. The reel 128 of the transfer turret 26 is driven in a clockwise direction by a chain drive 312 which connects the shaft 117 of the feed valve 22 to the shaft 130 of the transfer turret 26.

A chain drive 314 interconnects the main drive shaft 304 and the shaft 158 thereby driving the shaft 158 in a clockwise direction and the reel 170 of the sterilizer 28 in a counterclockwise direction. A gear 316 keyed to the shaft 158 meshes with a gear 318 keyed to the shaft 222 thereby driving the precooler gears 220 in a counterclockwise direction and the reel 218 of the precooler 36 in a clockwise direction. The reel 262 of the final cooler 42 is continuously driven in a counterclockwise direction by a chain drive 320 which interconnects the shafts 222 and 274.

The reel 212 of the transfer turret 32 is driven in a counterclockwise direction by a chain drive 322 which is trained around a sprocket keyed to the shaft 130 of the transfer turret 26, around an idler sprocket 326 rotatably supported by a bracket 328 secured to the precooler housing 216, and around a sprocket 330 (FIG. 6) keyed to the shaft 214 of the transfer turret 32. The reel 280 of the discharge valve 44 is driven in a counterclockwise direction, and the let-down device 34 is driven in a clockwise direction by a chain drive 332. The transfer device 38 is driven in a clockwise direction by a chain drive 334 interconnecting the let-down device 34 and the shaft 246 of the transfer device 38.

Power is transmitted from the shaft 282 of the discharge valve 44 to the let-down device 40 by a chain drive 336 thereby driving the let-down device 40 in a counterclockwise direction. The let-down device 40 is connected to the let-down device 30 by a chain drive 338 and drives the device 30 in a counterclockwise direction, while a chain drive 340 connects the let-down device 30 to the screw conveyor shaft 193 and drives the conveyor 192 in a counterclockwise direction.

Thus, the drive system 300 continuously drives all row handling components of the cooking and cooling apparatus 20 in the proper direction and at a rate of about four rows per minute. Although the let-down devices 30, 34 and 40 have been shown as being driven by chain drives, it is apparent that these devices could be driven directly from the reel of the sterilizer 28, precooler 36, and final cooler 42 if desired.

As mentioned previously, the preferred heat treatment medium is water maintained at the desired temperature and subjected to an overriding air pressure in the preheater 24. It will be appreciated therefore that water will be discharged from the discharge valve 44 (FIG. 2) each time a row of processed containers C is discharged from the apparatus 20 onto the take-away conveyor 46. This water may be collected by a trough 350 and be returned to the precooler 36 of the apparatus 20, along with additional make up water, by a pump P as diagrammatically illustrated in FIGURE 2.

Air under pressure, for example 30 p.s.i.g. if the sterilizing temperature is 250° F., may be directed into the preheater 24 through a valved conduit 352, and make up water may be added to the preheater 24 by a valved conduit 354. Steam is directed into the preheater 24 and into the sterilizer 28 by a conduit system 356 diagrammatically illustrated in FIGURE 2 in order to heat the water to the desired temperature. The conduit system 356 preferably includes a plurality of longitudinally extending thermostatically controlled conduits disposed around the periphery of the preheater 24 and sterilizer 28 so that steam may be injected into the associated housings as required.

A second thermostatically controlled conduit system 360, which system includes the pump P and trough 350, directs cool water into the precooler 36 and final cooler 42 at spaced intervals therearound. Excess water is drained from the system by a conduit 362 having a pressure relief valve 364 therein, which relief valve opens when the pressure within the apparatus 20 raises above a predetermined desired level.

Although the specific details of the conduit systems 356 and 360 form no part of the present invention, and the specific temperatures and overriding pressure maintained in the apparatus will vary in accordance with the specific product being handled, it will be noted that the annular design, as opposed to a cylindrical design, of the several processing chambers readily lends itself to maintaining the water in the preheater 24 at variable temperature so that the water temperature progressively increases from the upper end thereof to a point immediately adjacent the transfer turret 26. Similarly, the water in the precooler 36 and final cooler 42 may progressively decrease in temperature from substantially the sterilizing temperature adjacent the transfer turret to a temperature well below the boiling point of water at atmospheric pressure adjacent the discharge valve 44.

If desired, steam may be directed into the transfer valve 26 from a conduit system 366 to abruptly raise the temperature of the jars in the transfer turret 26 thereby subjecting the jars to a thermal shock which will cause all the defective jars in the rows of containers passing therethrough to break prior to reaching the screw conveyor 192 thereby assuring that the screw conveyor will advance all broken containers out of the apparatus 20 rather than permitting the jars to break in some other part of the apparatus downstream of the screw conveyor 192. It will also be understood that a thermal shock may be imparted to the glass jars as the jars enter the sterilizer instead of when the jars are in the transfer turret.

In the operation of the cooking and cooling apparatus 20 of the present invention rows of containers, for example, 100 containers being present in each row, are deflected from the row forming device 114 by the hydraulic deflector 120 into the rotary pressure feed valve 22. The rotary feed valve 22 transfers the rows of containers at the rate of about four rows per minute into the pockets of the reel 62 of the preheater 24. While in the preheater, the rows of containers first move through an atmosphere of air maintained at an overriding pressure of about 30 p.s.i. gauge and then move the containers into water which is maintained in the range of about 140° F. to 160° F. at the inlet end and gradually increases to a temperature of about 210° F. to 250° F. adjacent the opening leading to the transfer turret 26.

If it is desired to induce glass breakage of defective containers while the containers move through the turret 26, steam sufficient to raise the temperature of the heating medium within the turret 26 about 5° F. higher than the sterilizing temperature is introduced into the turret 26 through the conduit 366 thereby imparting a thermal shock to the glass walls of the containers which will cause any defective containers to break while in the pockets of the transfer turret 26.

The rows of containers are then transferred into the pockets 175 of the reel 170 of the sterilizer 28 with the aid of the let-down device 30, and gradually advances these containers in a counterclockwise direction (FIG. 2). As these containers move over the spaced bars 194, all broken containers including caps and the product therein fall into the trough 196 and are conveyed by the screw conveyor 192 into the accumulator 200 (FIGS. 1 and 4) for subsequent removal from the apparatus 20.

A temperature of about 250° F. to 275° F. is maintained in the sterilizer thereby completely sterilizing the product by the time the rows of containers have been released into the reel 212 of the transfer turret 32. The transfer turret 32 then lowers the rows of containers with the aid of the let-down device 34, into the reel pockets of the reel 218 of the precooler 36. The reel 218 then advances the containers in a clockwise direction through cooling water in the precooler 36 until the containers engage the transfer device 38, which with the aid of the arcuate guide 248 (FIG. 5) and the let-down device 40, lowers the rows of partially cooled containers into the pockets of the reel 262 of the final cooler 42. The reel 262 then advances the rows of containers in a counterclockwise direction through the coolant until the containers are released into the pockets of the rotary discharge valve 44 which valve discharges the rows of containers one at a time upon the take-away conveyor 290 for removal from the apparatus 20. The cooling water introduced into the precooler 36 and final cooler 42 through the conduit system 360 is effective to gradually cool the rows of containers from about 250° F. adjacent the transfer valve 32 to about 104° F. adjacent the discharge valve 44.

Although the best mode contemplated for carrying out the present invention has been herein shown and described, it will be apparent that modifications and variations may be made without departing from what is regarded to be the subject matter of the invention as set forth in the appended claims.

Having completed a detailed description of the invention so that those skilled in the art could practice the same, I claim:

1. In a rotary cooking and cooling apparatus the combination of means defining an elongated annular housing having an elongated inlet opening and an elongated discharge opening, feed means for advancing cooker length rows of containers into said annular housing, a reel rotatably mounted within said housing and including means defining a plurality of equally spaced pockets extending substantially the full length of the apparatus for accommodating cooker length rows of containers therein and for advancing the containers between said inlet opening and said discharge opening, means for directing a heat treatment medium into said housing, transfer means for receiving processed rows of containers from said annular housing and for discharging the rows from said housing, and means for driving said reel, said feed means and said transfer means in timed relation.

2. An apparatus according to claim 1 wherein said inlet opening is in the outer wall of said annular housing and said discharge opening is in the inner wall of said housing.

3. An apparatus according to claim 2 and additionally comprising a second annular housing encompassed by said first annular housing and having a second elongated inlet opening communicating with said transfer, means for receiving rows of containers therefrom and a second elongated discharge opening spaced from said second inlet opening, a second reel mounted for rotation within said second annular housing and arranged to receive the rows of containers from said transfer means, second transfer means communicating with said second discharge opening for receiving and discharging rows of containers from said second reel, and second drive means for driving said second drive reel and said second transfer means in timed relation to said first mentioned drive means.

4. An apparatus according to claim 1 wherein said drive means effects movement of said reel, said feed means, and said transfer means at the rate of about four rows per minute.

5. An apparatus according to claim 1 wherein said annular housing is a sealed housing and wherein said heat treatment medium is under superatmospheric pressure; and wherein said feed means, a driven pressure sealing means, and means that is connected to said sealing means and establishes pressure communication with said transfer means cooperate to maintain said superatmospheric pressure within said annular housing.

6. An apparatus according to claim 2 wherein said feed means is a rotary pressure feed valve which extends the full length of the apparatus and comprises a cylindrical housing having an elongated inlet opening and an elongated discharge opening, and a driven rotor sealed to and journaled in said cylindrical housing and having a plurality of equally spaced pockets therein for receiving cooker length rows of containers and advancing them into said annular housing.

7. An apparatus according to claim 6 wherein said transfer means is a second rotary valve which extends the full length of the apparatus and comprises a second cylindrical housing having an elongated inlet opening and an elongated discharge opening, and a second driven rotor journaled in said second cylindrical housing and having a plurality of equally spaced pockets therein for receiving cooker length rows of processed containers from said annular housing and discharging them therefrom.

8. An apparatus according to claim 5 wherein said transfer means is a rotary valve which extends the full length of the apparatus and comprises a cylindrical housing having an elongated inlet opening and an elongated discharge opening, and a driven rotor journaled in said cylindrical housing and having a plurality of equally spaced pockets therein for receiving cooker length rows of containers from said annular housing and discharging them therefrom.

9. An apparatus according to claim 5 wherein said feed means and said pressure sealing means each includes a rotary pressure valve, each of said rotary pressure valves comprising a cylindrical housing having an elongated inlet opening and an elongated discharge opening, and a driven rotor sealed to and journaled in each of said cylindrical housings and having a plurality of equally spaced pockets therein for accommodating groups of containers.

10. An apparatus according to claim 2 wherein said heat treatment medium is water subjected to an overriding air pressure and wherein said means for directing the heat treatment medium into said annular housing is thermostatically controlled so that the temperature of the water will gradually change in the direction of movement of the rows of containers through said annular housing whereby thermal shock will be avoided and the temperature of the containers and product therein will gradually reach the desired temperature.

11. An apparatus according to claim 5 wherein said means establishing pressure communication additionally comprises a second annular housing having a second elongated inlet opening communicating with said transfer means for receiving rows of containers therefrom and a second elongated discharge opening spaced from said second inlet opening, means for closing the ends of said second annular housing, a second reel mounted for rotation within said second annular housing and arranged to receive the rows of containers from said transfer means, second transfer means communicating with said second discharge opening for receiving rows of containers from said second reel and discharging the rows from said second annular housing, a third annular housing encompassed by said second annular housing and having a third elongated inlet opening therein communicating with said second transfer means for receiving rows of containers therefrom and having a third elongated discharge opening therein for discharging rows of containers therefrom, means for closing the ends of said third annular housing, a third reel rotatably mounted within said third housing for advancing the rows of containers from said third inlet opening to said third discharge opening, a fourth annular housing encompassed by said third annular housing and having a fourth elongated inlet opening communicating with said third discharge opening for receiving rows of containers therefrom and having a fourth elongated discharge opening for discharging containers therefrom, means for closing the ends of said fourth annular housing, a fourth reel rotatably mounted within said fourth annular housing for advancing the rows of containers from said fourth inlet opening to said fourth discharge opening, said pressure sealing means connected to and communicating with said fourth discharge opening for discharging the rows of containers from said fourth annular housing, means for directing heat treatment mediums into each of said housings, and second drive means for driving said second, third, and fourth reels and said second, and pressure sealing means in timed relation with said first mentioned drive means.

12. An apparatus according to claim 11 wherein said first and second drive means drives all of said reels, said feed means, said transfer means and said pressure sealing means continuously and wherein the heat treatment mediums in said housings is water maintained at the desired temperature.

13. An apparatus according to claim 12 wherein said first mentioned feed means and said pressure sealing means are rotary pressure valves, and wherein means are provided to direct air under high pressure in said first mentioned annular housing so that heat treatment of the containers within all of said housings is performed under superatmospheric conditions.

14. An apparatus according to claim 13 wherein the rows of containers being processed are rows of glass jars and wherein the temperature change between said first annular housing and said second annular housing is sufficient to induce breakage of defective containers, and means connected to said second annular housing for separating the broken jars from the sound jars and for removing the broken jars from said second annular housing during normal operation of the apparatus.

References Cited

UNITED STATES PATENTS

| | | | |
|---|---|---|---|
| 865,645 | 9/1907 | Jennings | 99—364 |
| 1,154,611 | 9/1915 | Burpee | 99—365 XR |
| 1,301,428 | 4/1919 | Gitterman | 99—361 XR |
| 1,457,852 | 6/1923 | Northrup et al. | 99—363 |
| 1,467,960 | 9/1923 | Thompson | 99—361 |
| 1,484,259 | 2/1924 | Fowle et al. | 99—360 XR |
| 1,485,851 | 3/1924 | Hopper | 99—360 |
| 1,859,389 | 5/1932 | Graham | 99—361 |
| 1,883,606 | 10/1932 | DeBack et al. | 99—361 |
| 2,585,213 | 2/1952 | Baker | 99—362 XR |

WALTER A. SCHEEL, Primary Examiner

JOHN M. BELL, Assistant Examiner

U.S. Cl. X.R.

99—185, 214, 368, 370, 371